(12) United States Patent
Marzban et al.

(10) Patent No.: US 12,568,503 B2
(45) Date of Patent: Mar. 3, 2026

(54) ANTICIPATORY NACK FOR DECODING FAILURE PREDICTION

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 18/068,194

(22) Filed: Dec. 19, 2022

(65) Prior Publication Data

US 2024/0205924 A1      Jun. 20, 2024

(51) Int. Cl.
| | |
|---|---|
| *H04W 72/23* | (2023.01) |
| *H04L 1/08* | (2006.01) |
| *H04L 5/00* | (2006.01) |
| *H04W 72/1263* | (2023.01) |
| *H04W 72/541* | (2023.01) |

(52) U.S. Cl.
CPC .............. *H04W 72/23* (2023.01); *H04L 1/08* (2013.01); *H04L 5/0053* (2013.01); *H04W 72/1263* (2013.01); *H04W 72/541* (2023.01)

(58) Field of Classification Search
CPC ............... H04W 72/23; H04W 72/541; H04W 72/1263; H04L 1/08; H04L 5/0053
See application file for complete search history.

(56) References Cited

U.S. PATENT DOCUMENTS

| | | | |
|---|---|---|---|
| 2009/0287976 A1* | 11/2009 | Wang | H04L 1/1896 |
| | | | 714/E11.131 |
| 2022/0303917 A1* | 9/2022 | Nam | H04W 52/367 |
| 2022/0376837 A1* | 11/2022 | Sun | H04L 1/1864 |
| 2022/0386329 A1* | 12/2022 | Yu | H04W 72/23 |
| 2023/0262703 A1* | 8/2023 | Chen | H04B 7/086 |
| | | | 370/329 |
| 2023/0354311 A1* | 11/2023 | Xue | H04L 5/0044 |
| 2023/0421324 A1* | 12/2023 | Sakhnini | H04B 7/06966 |
| 2024/0114451 A1* | 4/2024 | He | H04W 52/0229 |

* cited by examiner

*Primary Examiner* — Mewale A Ambaye
(74) *Attorney, Agent, or Firm* — Shumaker & Sieffert, P.A.

(57) ABSTRACT

Techniques related to using an anticipatory NACK for a decoding failure prediction are disclosed. Some aspects of the disclosure relate to devices and methods for wireless communication including obtaining downlink control information (DCI) including scheduling information for a data transmission over one or more data channel resources. When a predictive channel model predicts a high probability of a decoding failure for the one or more data channel resources, based on the high probability of decoding failure, an anticipatory NACK may be transmitted, indicating an anticipated failure to properly decode the data transmission. Other aspects, embodiments, and features are also claimed and described.

20 Claims, 9 Drawing Sheets

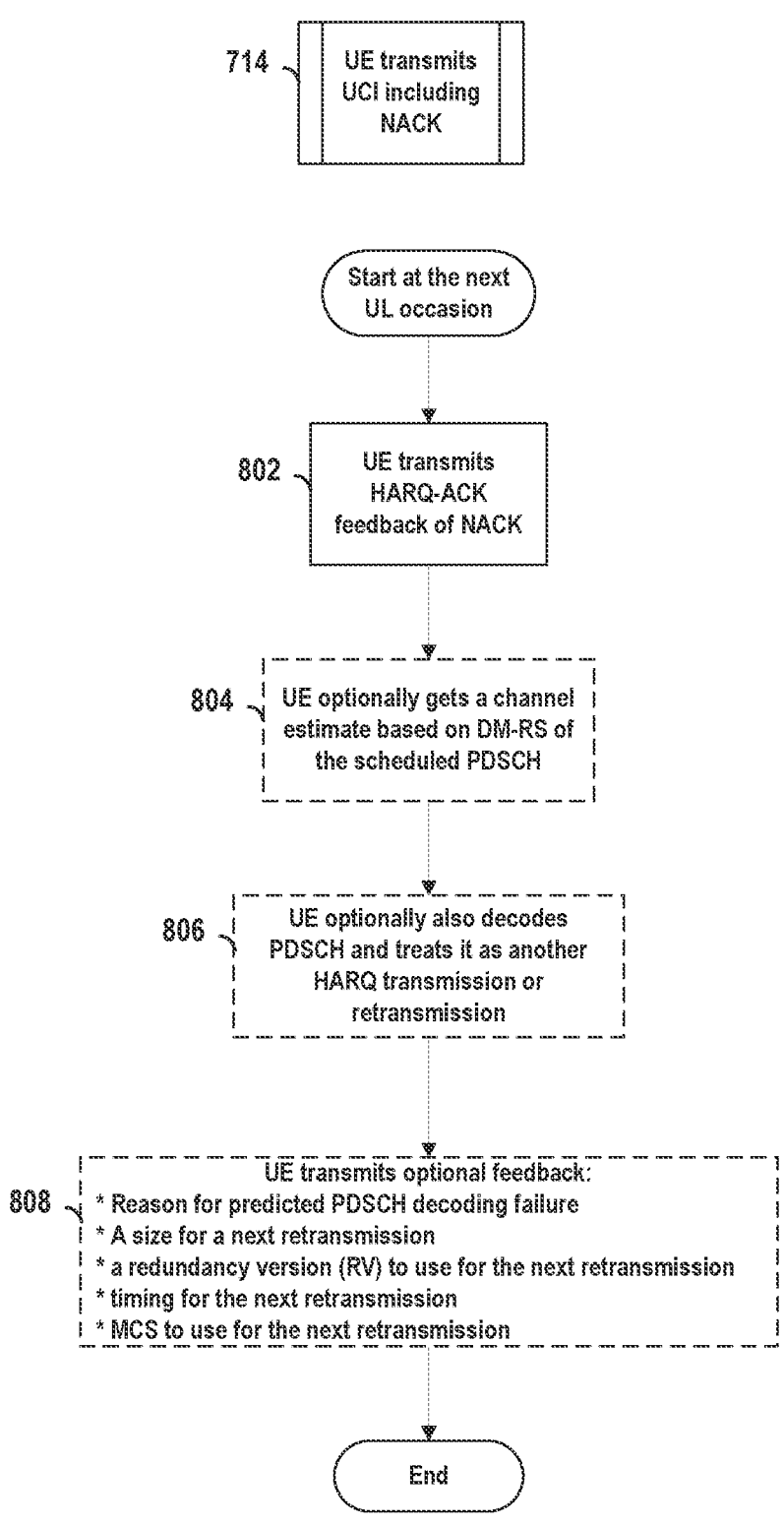

714 — UE transmits UCI including NACK

Start at the next UL occasion

802 — UE transmits HARQ-ACK feedback of NACK

804 — UE optionally gets a channel estimate based on DM-RS of the scheduled PDSCH 806 — UE optionally also decodes PDSCH and treats it as another HARQ transmission or retransmission 808 — UE transmits optional feedback:
* Reason for predicted PDSCH decoding failure
* A size for a next retransmission
* a redundancy version (RV) to use for the next retransmission
* timing for the next retransmission
* MCS to use for the next retransmission End

FIG. 8

900
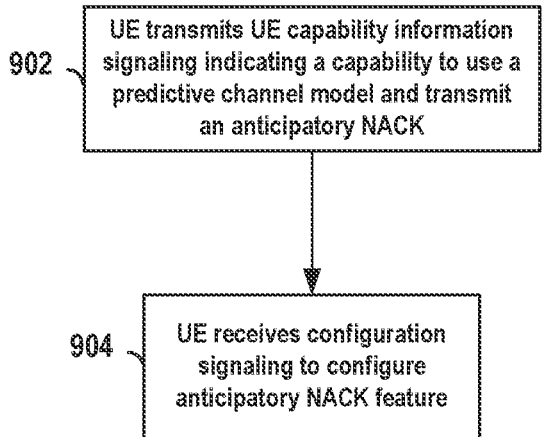
902 — UE transmits UE capability information signaling indicating a capability to use a predictive channel model and transmit an anticipatory NACK
904 — UE receives configuration signaling to configure anticipatory NACK feature
FIG. 9

ANTICIPATORY NACK FOR DECODING FAILURE PREDICTION

TECHNICAL FIELD

The technology discussed below relates generally to wireless communication systems, and more particularly, to error detection procedures. Certain aspects may relate to techniques for enabling and providing communication devices configured to transmit an anticipatory NACK based on a decoding failure prediction.

BACKGROUND

Hybrid Automatic Repeat request (HARQ) generally describes a set of procedures for reliable data communication with forward error correction (FEC) and packet retransmissions. With HARQ. FEC is applied before transmitting a packet from a transmitting device to a receiving device. In addition, a data integrity mechanism such as a cyclic redundancy check (CRC) may be used, where CRC bits are appended to the encoded packet. The receiving device attempts to decode the packet and compares the CRC it receives with CRC bits locally computed at the receiving device based on the decoded packet. If the receiving device is able to confirm that it properly received and decoded the packet, it may transmit an acknowledgment (ACK) back to the transmitting device. However, if the receiving device is unable to confirm the CRC, it may transmit a negative acknowledgment (NACK) back to the transmitting device. In response to a NACK, the transmitting device may send a HARQ retransmission of the packet to the receiving device. In this manner, through an iterative process very highly reliable data communications can be achieved.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. And unless expressly described, no one aspect or feature is essential to achieve technical effects or solutions discussed herein.

In various aspects, the present disclosure provides for an anticipatory NACK, transmitted directly when a wireless user equipment (UE) predicts with high confidence (e.g., with a probability greater than a threshold) a decoding failure of a data transmission.

This anticipatory NACK can save UE power, as the UE may forgo to attempt to decode the incoming data transmission. Further, the UE may forgo to sample the channel and generate a channel estimate. In some examples, a UE may enable an anticipatory NACK feature when the UE is in a power saving mode, and when the UE predicts a failed data transmission, the UE can transmit the anticipatory NACK and sleep early.

Further, this anticipatory NACK can save base station (gNB) power. For example, if a UE transmits an anticipatory NACK, the gNB can complete its retransmissions early and sleep to reduce power consumption.

Still further, this anticipatory NACK can reduce latency in a HARQ procedure. For example, the anticipatory NACK may be transmitted right away (e.g., at the first uplink opportunity) after receiving a resource allocation, without waiting to attempt to decode the scheduled transmission.

In some aspects, an apparatus for wireless communication is disclosed. The apparatus includes a memory storing instructions and one or more processors configured to execute the instructions. The apparatus obtains downlink control information (DCI) including scheduling information for a data transmission over one or more data channel resources corresponding to a data channel. The apparatus predicts a probability of a decoding failure for the one or more data channel resources. Based on the probability of the decoding failure, the apparatus outputs, for transmission, an anticipatory negative acknowledgment (NACK) indicating an anticipated failure to properly decode the data transmission.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

BRIEF DESCRIPTION OF THE DRAWINGS

FIG. 8 is a flow chart illustrating an example of a process for transmitting an anticipatory NACK according to some aspects of this disclosure.

FIG. 9 is a flow chart illustrating an example of a process for configuring a UE for using an anticipatory NACK according to some aspects of this disclosure.

DETAILED DESCRIPTION

When there is data to send to a wireless user equipment (UE) operating in a scheduled network, the network transmits scheduling information to the UE to let the UE know that there is an incoming transmission. This scheduling information may include information such as a time domain resource allocation (TDRA) indicating a time when the incoming transmission will take place, and a frequency domain resource allocation (FDRA) indicating what frequency or frequencies the incoming transmission will use.

In some scenarios, a UE may predict that there will be a high level of interference, or a low channel power, on the scheduled resources. For example, a UE may employ a predictive channel model, which may use artificial intelligence (AI) to model interference and/or channel power as it progresses over time, in a way that the UE can predict the poor channel conditions in the future. As one simple example, a UE may recognize a certain pattern of interference that occurs before a bus crosses into a signal path and blocks a signal. In some aspects of the present disclosure, the UE can directly report an anticipatory NACK when the UE predicts that poor channel conditions will with a high confidence (e.g., with a confidence above a suitable threshold, such as 80% or 90% decoding failure probability) cause a decoding failure if the UE were to attempt to receive and decode a scheduled data transmission. In this way, the UE can save power by skipping what may be a futile attempt to decode the scheduled data transmission. The UE can additionally reduce the latency of the HARQ process by directly transmitting the anticipatory NACK after receiving the scheduling grant. This can improve the HARQ timeline, and the base station can queue up a HARQ retransmission of the data immediately upon receiving the anticipatory NACK.

Figure 1:
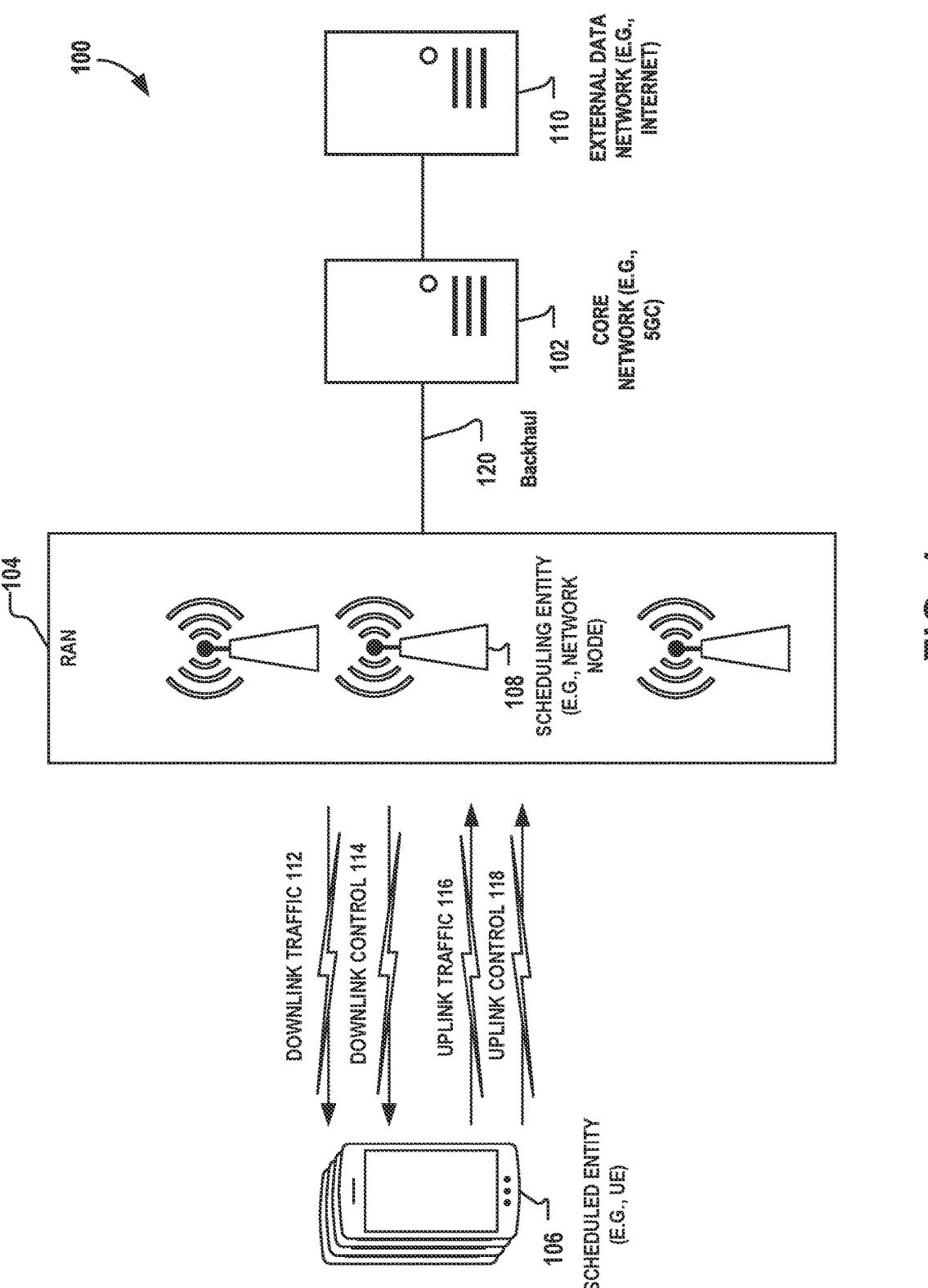
FIG. 1 is a schematic illustration of a wireless communication system according to some aspects of this disclosure.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of network nodes 108. Broadly, a network node is a network element in a radio access network responsible for radio transmission and reception in one or more cells to or from a UE. In different technologies, standards, or contexts, those skilled in the art may variously refer to a "network node" as a base station, a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a transmit receive point (TRP), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface, or may indirectly communicate with one another over a network (e.g., a local area network or LAN).

Wireless communication between a RAN 104 and a UE 106 may be described as utilizing an air interface. Transmissions over the air interface from a base station (e.g., network node 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., network node 108). Another way to describe this scheme may be to use the term broadcast channel multiplexing. Transmissions from a UE (e.g., UE 106) to a base station (e.g., network node 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a network node 108) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by a scheduling entity such as network node 108.

Base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node 108 may broadcast downlink traffic 112 to one or more UEs 106. Broadly, the network node 108 is a node or device responsible for scheduling traffic in a wireless communication network, including downlink traffic 112 and, in some examples, uplink traffic 116 from one or more UEs 106 to the network node 108. On the other hand, the UE 106 is a node or device that receives downlink control information 114, including but not limited to scheduling information (e.g., a grant), synchronization or timing information, or other control information from another entity in the wireless communication network such as the network node 108.

In general, network nodes 108 may include a backhaul interface for communication with a backhaul portion 120 of the wireless communication system. The backhaul 120 may provide a link between a network node 108 and the core network 102. Further, in some examples, a backhaul network may provide interconnection between the respective network nodes 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some examples, a UE 106 may be configured with a predictive channel model for modeling the channel between the UE 106 and a network node 108. Based on a channel prediction indicating a certain probability of a decoding failure of a scheduled transmission, the UE 106 may be configured to transmit an anticipatory NACK to the network node 108. With the anticipatory NACK, in some examples, the UE 106 may transmit the NACK feedback directly without necessarily making an attempt to decode the scheduled data transmission.

Figure 2:
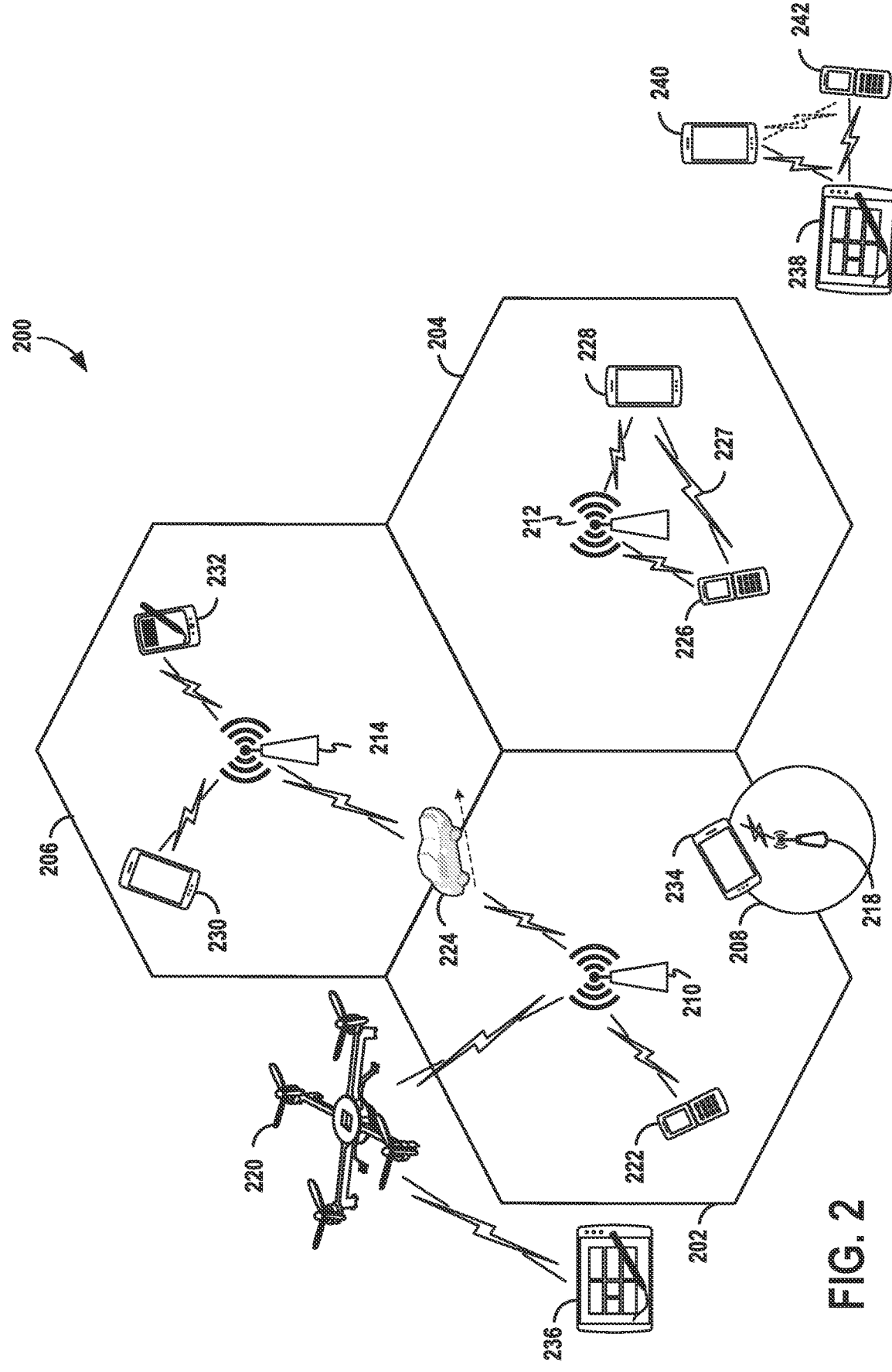
FIG. 2 is a conceptual illustration of an example of a radio access network according to some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, the cells 202, 204, and 206 may be referred to as macrocells, as the network nodes 210, 212, and 214 support cells having a large size. Further, a network node 218 is shown in the small cell 208 (e.g., a microcell, picocell, femtocell, home base station, home Node B, home eNode B, etc.) which may overlap with one or more macrocells. In this example, the cell 208 may be referred to as a small cell, as the network node 218 supports a cell having a relatively small size. Cell sizing can be done according to system design as well as component constraints.

The RAN 200 may include any number of wireless network nodes and cells. Further, a RAN may include a relay node to extend the size or coverage area of a given cell. The network nodes 210, 212, 214, 218 provide wireless access points to a core network for any number of mobile apparatuses. In some examples, the network nodes 210, 212, 214, and/or 218 may be the same as the network node 108 described above and illustrated in FIG. 1.

FIG. 2 further includes a quadcopter or drone 220, which may be configured to function as a network node. That is, in some examples, a cell may not necessarily be stationary, and the geographic area of the cell may move according to the location of a mobile network node such as the quadcopter 220.

Within the RAN 200, each network node 210, 212, 214, 218, and 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with mobile network node 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with network node 210.

In a further aspect of the RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more multiplexing and multiple access algorithms to enable simultaneous communication of the various devices. For example, 5G NR specifications provide multiple access for UL transmissions from UEs 222 and 224 to network node 210, and for multiplexing for DL transmissions from network node 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a network node may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
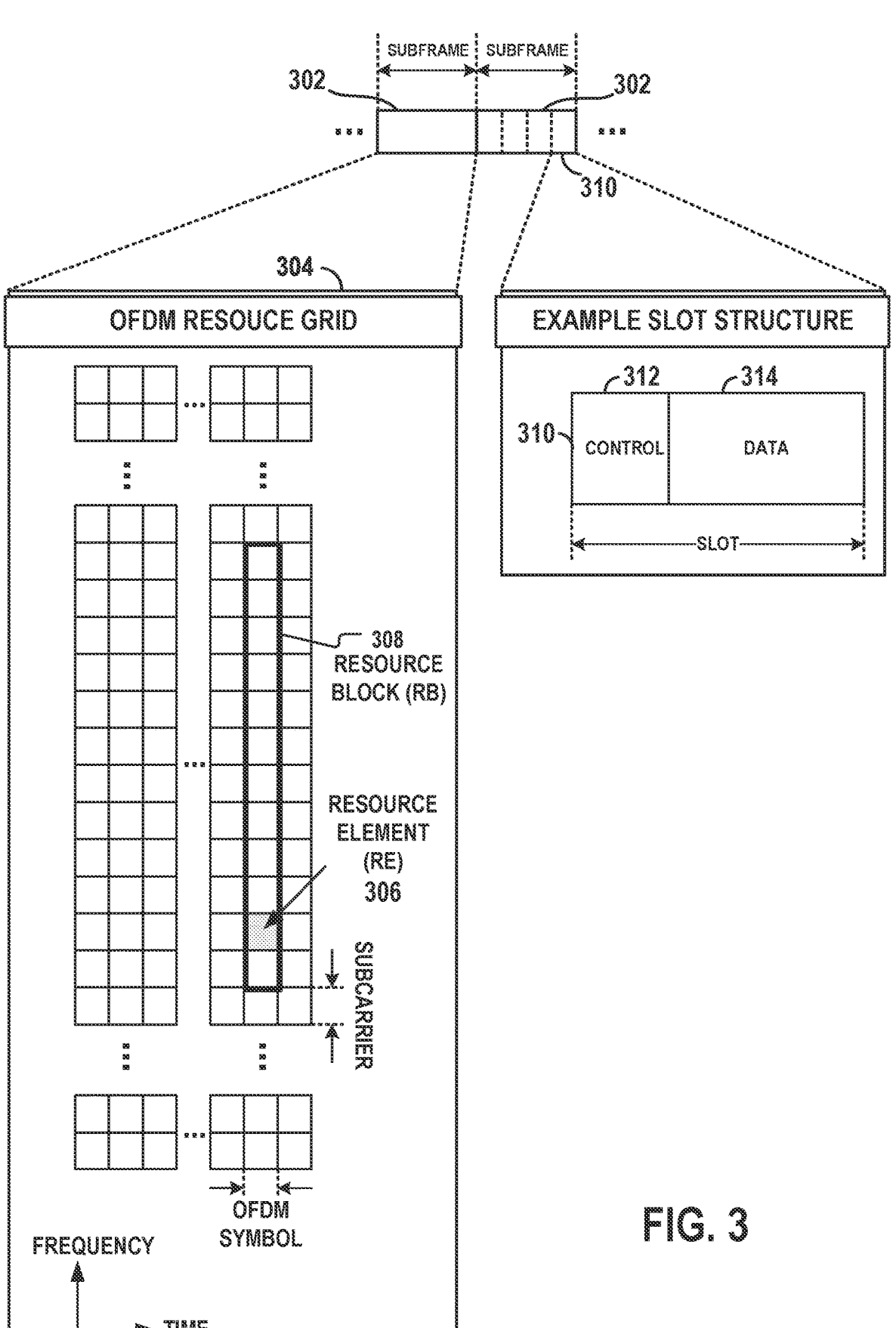
FIG. 3 is a schematic illustration of an organization of wireless resources in an air interface utilizing orthogonal frequency divisional multiplexing (OFDM) according to some aspects of this disclosure.

FIG. 3 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may include a set of subframes (e.g., 10 subframes of 1 ms each). A given carrier may include one set of frames in the UL, and another set of frames in the DL. FIG. 3 illustrates an expanded view of an exemplary DL subframe 302, showing an OFDM resource grid 304. However, as those skilled in the art will readily appreciate, the PHY transmission structure for any application may vary from the example described here, depending on any number of factors. Here, time is in the horizontal direction with units of OFDM symbols; and frequency is in the vertical direction with units of subcarriers or tones.

The resource grid 304 may schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may span 12 subcarriers, a number independent of the numerology used. In some examples, depending on the numerology, an RB may include any suitable number of consecutive OFDM symbols in the time domain.

A given UE generally utilizes only a subset of the resource grid 304. An RB may be the smallest unit of resources that a scheduler can allocate to a UE. Thus, the more RBs scheduled for a UE, and the higher the modulation scheme chosen for the air interface, the higher the data rate for the UE.

In this illustration, RB 308 occupies less than the entire bandwidth of the subframe 302, with some subcarriers illustrated above and below the RB 308. In a given implementation, subframe 302 may have a bandwidth corresponding to any number of one or more RBs 308. Further, the RB 308 is shown occupying less than the entire duration of the subframe 302, although this is merely one possible example.

Each 1 ms subframe 302 may include one or multiple adjacent slots. In FIG. 3. one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A network node may in some cases transmit these mini-slots occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., a network node 108) may allocate one or more REs 306 (e.g., within a control region 312) to carry one or more DL control channels. These DL control channels include DL control information 114 (DCI) that generally carries information originating from higher layers, such as a physical broadcast channel (PBCH), a physical downlink control channel (PDCCH), etc., to one or more UEs 106. In addition, the network node may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A network node may transmit the synchronization signals PSS and SSS (collectively referred to as SS), and in some examples, the PBCH, in an SS block that includes 4 consecutive OFDM symbols. In the frequency domain, the SS block may extend over 240 contiguous subcarriers. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE 106) may utilize one or more REs 306 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the network node 108 to schedule uplink transmissions. Here, in response to the SR transmitted on the UL control channel 118 (e.g., a PUCCH), the network node 108 may transmit downlink control information (DCI) 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1 and 3 are not necessarily all the channels or carriers that may be utilized between a network node 108 and UE 106, and those of ordinary skill in the art will recognize that other channels or carriers may be utilized in addition to those illustrated, such as other traffic, control, and feedback channels.

Figure 4:
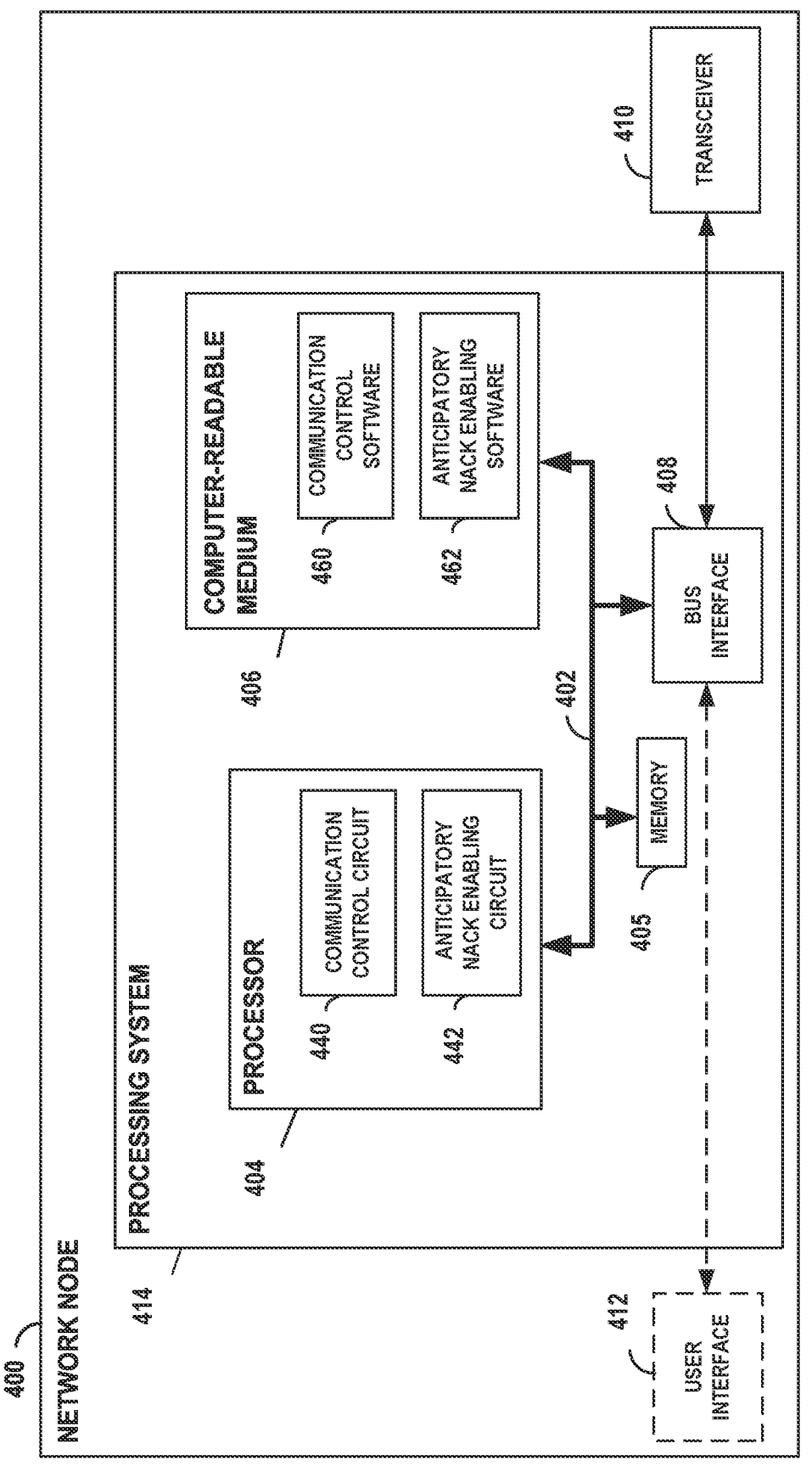
FIG. 4 is a block diagram conceptually illustrating an example of a hardware implementation for a network node (e.g., gNB) according to some aspects of this disclosure.

FIG. 4 is a block diagram illustrating an example of a hardware implementation for a network node 400 employing a processing system 414. For example, the network node 400 may be a user equipment (UE) as illustrated in any one or more of FIGS. 1 and/or 2. In another example, the network node 400 may be a base station (e.g., gNB) as illustrated in any one or more of FIGS. 1 and/or 2.

The network node 400 may include a processing system 414 having one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 400 may be configured to perform any one or more of the functions described herein.

The processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and some examples, such as a base station, may omit it.

In some aspects of the disclosure, the processor 404 may include communication control circuitry 440 configured (e.g., in coordination with the memory 405) for various functions, including, e.g., transmitting and/or receiving user data and/or control signaling to/from the network node 400. The processor 404 may further include anticipatory NACK enabling circuitry 442 configured (e.g., in coordination with the memory 405) for various functions, including, e.g., determining to enable or disable an anticipatory NACK feature as described in the present disclosure.

The processor 404 is responsible for managing the bus 402 and general processing, including the execution of software stored on the computer-readable medium 406. The software, when executed by the processor 404, causes the processing system 414 to perform the various functions described below for any particular apparatus. The processor 404 may also use the computer-readable medium 406 and the memory 405 for storing data that the processor 404 manipulates when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may store computer-executable code that includes communication control software 460 that configures a network node 400 for various functions, including, e.g., transmitting and/or receiving user data/control signaling to/from a UE. The computer-readable storage medium 406 may further store computer-executable code that includes anticipatory NACK enabling software 462 that configures a network node 400 for various functions, including, e.g., determining to enable/disable an anticipatory NACK feature at a given UE.

In one configuration, an apparatus 400 for wireless communication includes means for outputting, for transmission, user data and control information; and means for obtaining user data and control information from a UE. In one aspect, the aforementioned means may be the processor 404 shown in FIG. 4 (e.g., communication control circuit 440) configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1 and/or 2.

Figure 5:
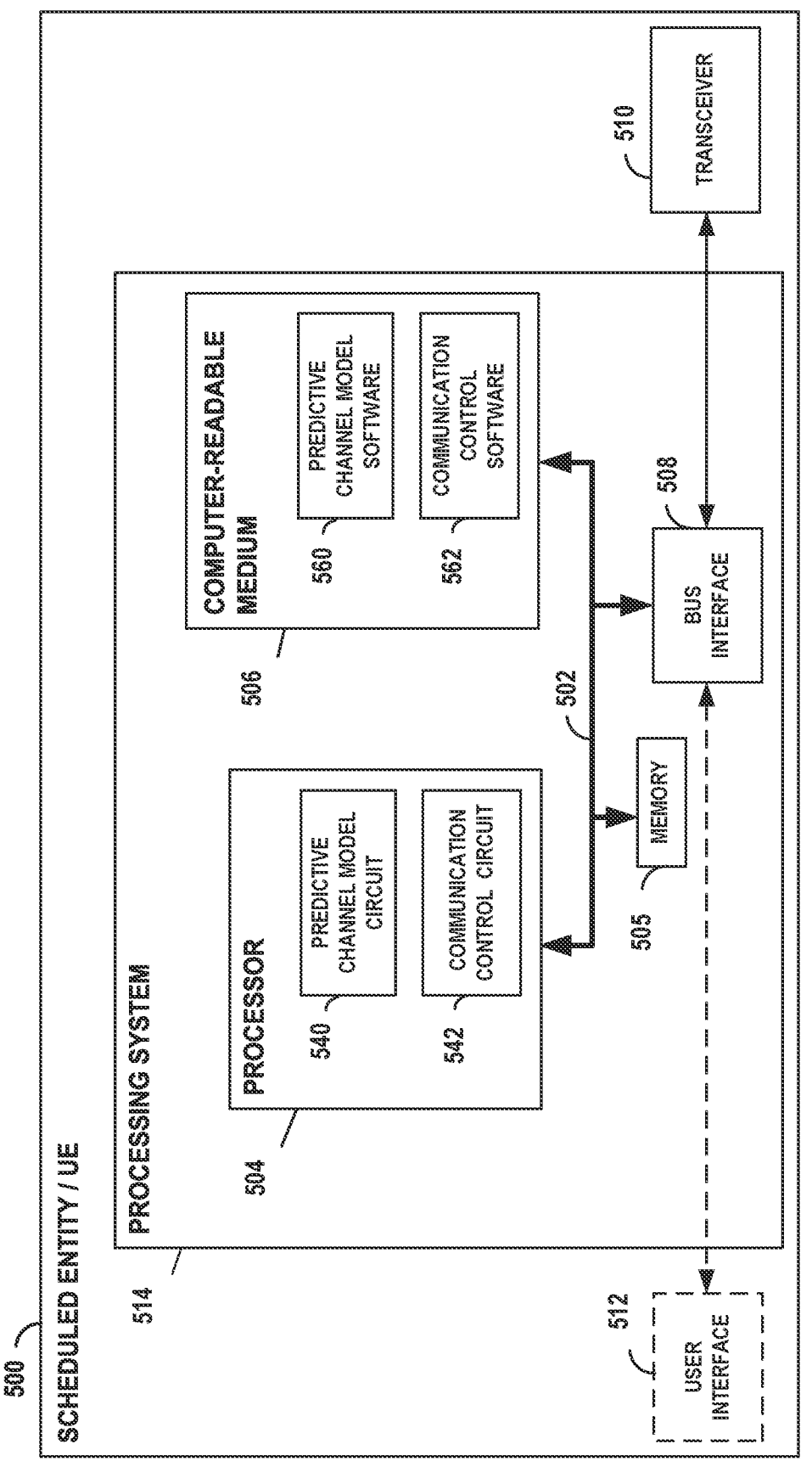
FIG. 5 is a block diagram conceptually illustrating an example of a hardware implementation for a user equipment (UE) according to some aspects of this disclosure.

FIG. 5 is a conceptual diagram illustrating an example of a hardware implementation for an exemplary scheduled entity 500 employing a processing system 514. In accordance with various aspects of the disclosure, a processing system 514 may include an element, or any portion of an element, or any combination of elements having one or more processors 504. For example, the scheduled entity 500 may be a user equipment (UE) as illustrated in any one or more of FIGS. 1 and/or 2.

The processing system 514 may be substantially the same as the processing system 414 illustrated in FIG. 4, including a bus interface 508, a bus 502, memory 505, a processor 504, and a computer-readable medium 506. Furthermore, the UE 500 may include a user interface 512 and a transceiver 510 substantially similar to those described above in FIG. 4. That is, the processor 504, as utilized in a UE 500, may be configured (e.g., in coordination with the memory 505) to implement any one or more of the processes described below and illustrated in FIGS. 6, 7, 8, and/or 9.

In some aspects of the disclosure, the processor 504 may include predictive channel model circuitry 540 configured (e.g., in coordination with the memory 505) for various functions, including, for example, characterizing channel conditions based on one or more reference signals, predicting a probability of a decoding failure for one or more data channel resources (e.g., processing the level of detected interference or channel power via a machine learning model to generate a decoding confidence estimate for a data channel), etc. The processor 504 may further include communication control circuitry 542 configured (e.g., in coordination with the memory 505) for various functions, including. for example, transmitting and/or receiving user data and/or control signaling to/from a gNB; enabling and disabling an anticipatory NACK feature; configuring the predictive channel model circuit 540 based on one or more parameters received from a gNB; encoding/decoding data for communication via the transceiver 510 over a wireless channel; HARQ functionality for the UE 500, etc.

And further, the computer-readable storage medium 506 may store computer-executable code that includes predictive channel model software 560 that configures a UE 500 for various functions, including, e.g., characterizing channel conditions based on one or more reference signals, predicting a probability of a decoding failure for one or more data channel resources (e.g., processing the level of detected interference or channel power via a machine learning model to generate a decoding confidence estimate for a data channel), etc. The computer-readable storage medium 506 may further store computer-executable code that includes communication control software 562 that configures a UE 500 for various functions, including, e.g., transmitting and/or receiving user data and/or control signaling to/from a network node; enabling and disabling an anticipatory NACK feature; configuring the predictive channel model software 560 based on one or more parameters received from a gNB; encoding/decoding data for communication via the transceiver 510 over a wireless channel; HARQ functionality for the UE 500, etc.

In one configuration, an apparatus 500 for wireless communication includes means for encoding and decoding information for wireless communication; means for obtaining a DCI; means for obtaining scheduling information for an anticipatory NACK resource; means for outputting an anticipatory NACK; means for obtaining from a network node a confidence configuration parameter configured to indicate a predetermined confidence threshold for a predictive channel model; and means for soft combining HARQ retransmissions. In one aspect, the aforementioned means may be the processor 504 shown in FIG. 5 (e.g., communication control circuit 542) configured to perform the functions recited by the aforementioned means. In another aspect, the aforementioned means may be a circuit or any apparatus configured to perform the functions recited by the aforementioned means.

In a further aspect, an apparatus 500 for wireless communication includes means for predicting a probability of a decoding failure for one or more data channel resources; means for measuring a level of interference and/or a channel power of a data channel; means for processing the measured interference and/or channel power via a machine learning model to generate a decoding confidence estimate; and means for determining that a decoding confidence estimate is less than a predetermined confidence threshold. In one aspect, the aforementioned means may be the processor 504 shown in FIG. 5 (e.g., predictive channel model circuitry 540) configured to perform the functions recited by the aforementioned means. In another aspect, the aforementioned means may be a circuit or any apparatus configured to perform the functions recited by the aforementioned means.

Figure 6:
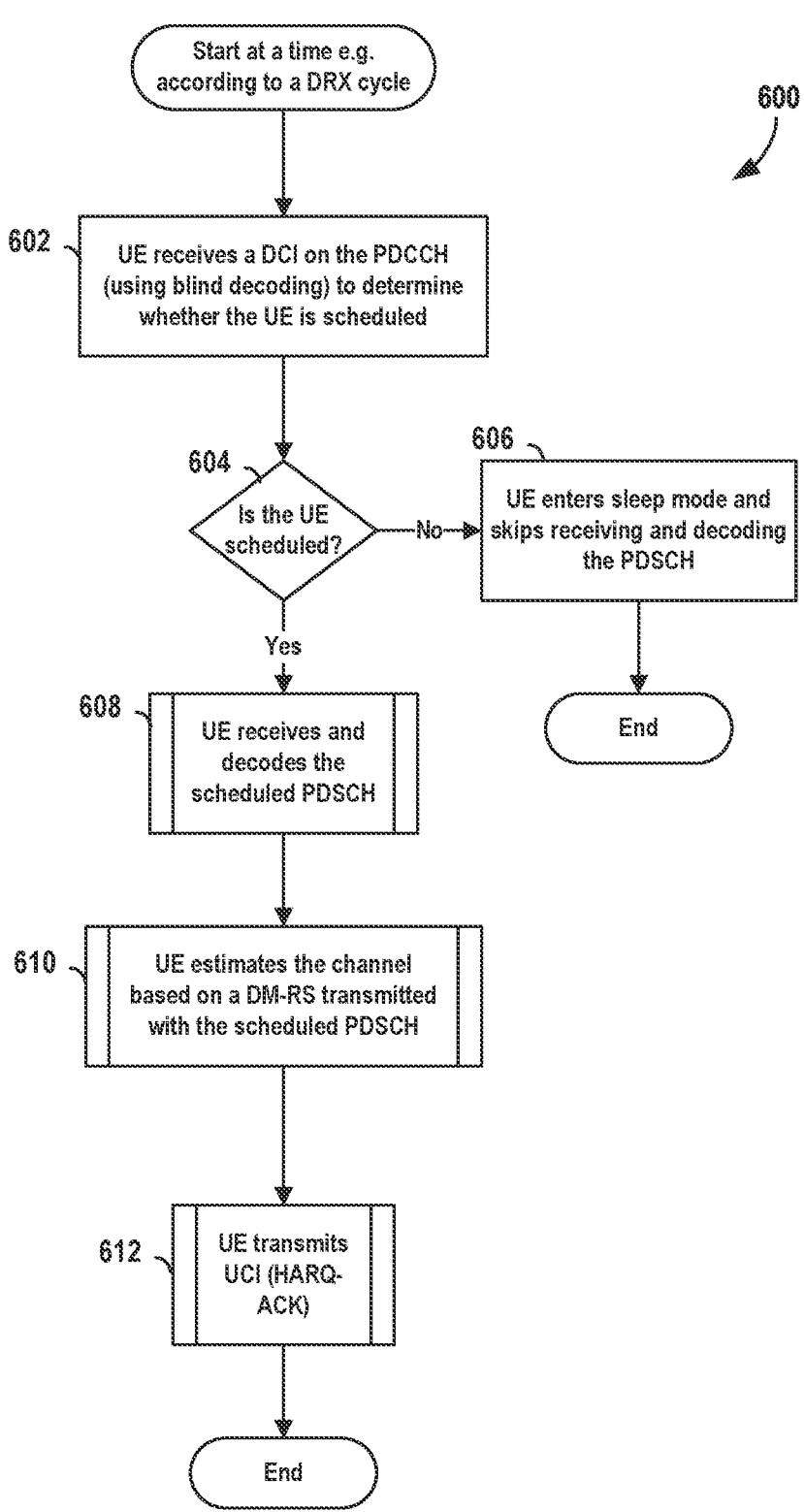
FIG. 6 is a flow chart illustrating an example of a process for receiving a scheduled downlink transmission according to some aspects of this disclosure.
Figure 7:
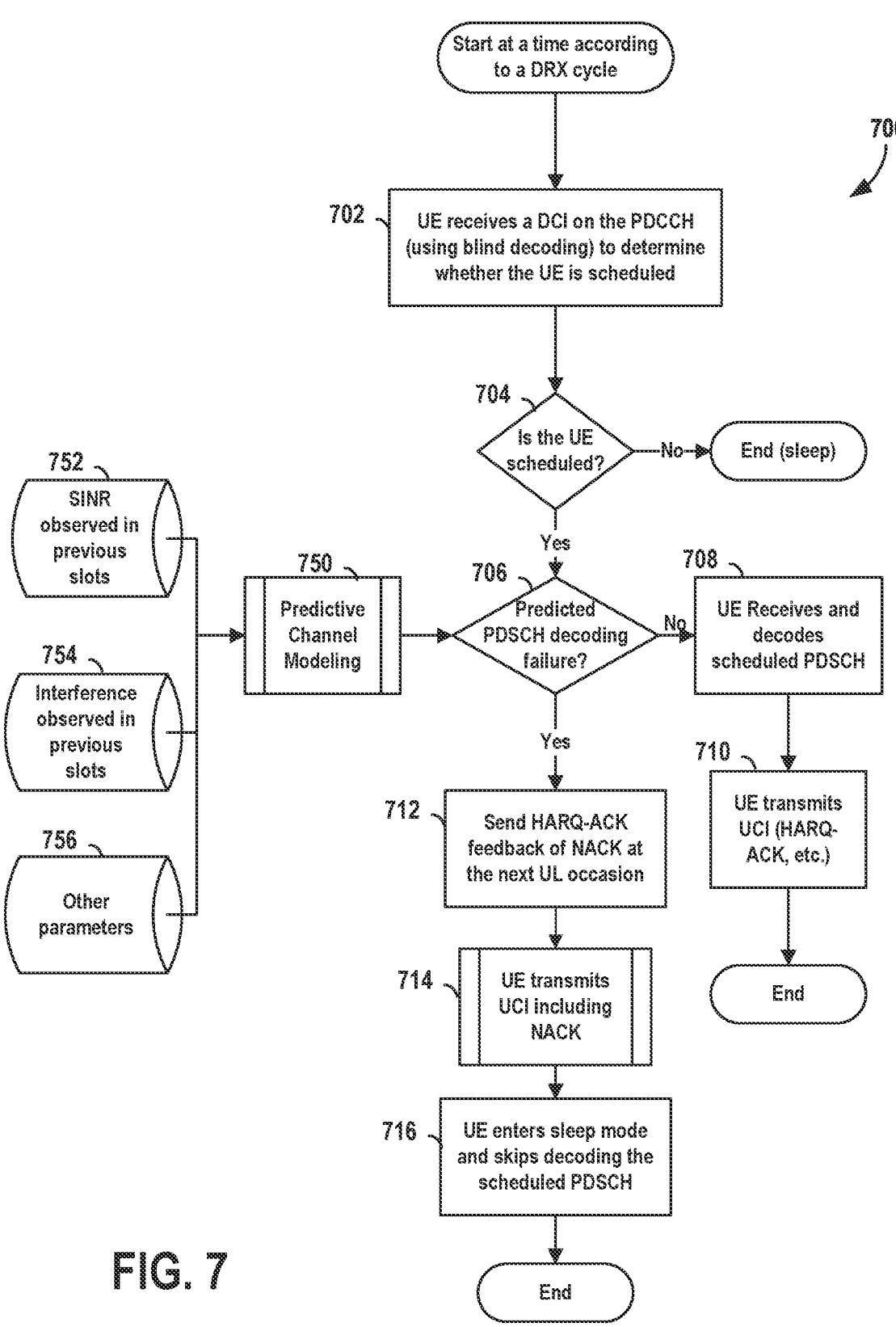
FIG. 7 is a flow chart illustrating another example of a process for receiving a scheduled downlink transmission according to some aspects of this disclosure.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1 and/or 2, and utilizing, for example, the processes and/or algorithms described herein in relation to FIGS. 6, 7, 8, and/or 9.

FIG. 6 is a flow chart illustrating an example of a UE process 600 for receiving a downlink data transmission according to some aspects of this disclosure.

When a UE is associated with a cell, a network node (e.g., a gNB) assigns the UE a search space. A search space is a set of candidate control channels that a UE is supposed to monitor and decode. Thus, at block 602, the UE blind decodes transmissions in its search space. If there is a DCI for the UE, then an integrity check (e.g., CRC) will confirm data integrity and the UE will obtain scheduling information carried in the DCI. That is, the UE receives and decodes a DCI carried on the PDCCH. Here, the DCI may include scheduling information, including a time domain resource allocation (TDRA), a frequency domain resource allocation (FDRA), a modulation and coding scheme (MCS), and other information scheduling resources on a data channel.

If the UE is not scheduled (No branch of 604), then at block 606 the UE may enter into a low-power mode (e.g., a sleep mode) and the UE may skip receiving and decoding the PDSCH. If the UE is scheduled (Yes branch of 604), then at block 608 the UE may receive and decode the data channel (PDSCH) as scheduled. As part of this action, at block 610 the UE may estimate the data channel based on a DM-RS transmitted with the scheduled PDSCH. This channel estimate may include determination of one or more channel parameters such as, but not limited to, a signal to interference plus noise ratio (SINR), a signal to noise ratio (SNR), an interference power estimate, etc.

When the UE receives and decodes a data transmission on the data channel (PDSCH), as discussed above, the UE may perform an integrity check (e.g., CRC) and may generate HARQ-ACK feedback in response to the data transmission. At block 612, the UE may transmit uplink control information (UCI) including this HARQ-ACK feedback on an uplink channel (e.g., PUCCH).

FIG. 7 is a flow chart illustrating another example of a UE process 700 for receiving a downlink data transmission according to further aspects of this disclosure, employing predictive channel modeling for transmission of an anticipatory NACK. As described below, a particular implementation may omit some or all illustrated features, and may not require some illustrated features to implement all embodiments. In some examples, the UE 106 of FIG. 1, any of the UEs of FIG. 2, and/or the UE 500 illustrated in FIG. 5 may be configured to carry out the process 700. In some examples, any suitable apparatus or means for carrying out the functions or algorithm described below may carry out the process 900.

In some examples, a UE may be configurable to use an anticipatory NACK feature or not. For example, a UE may operate in a first mode according to FIG. 6, and may operate in a second mode according to FIG. 7. In some examples, a gNB may configure a UE to operate in the first mode according to FIG. 6, or a second mode using an anticipatory NACK feature according to FIG. 7. For example, a gNB may enable or disable the anticipatory NACK feature based on the traffic type, based on the battery level of the UE, based on a priority indicator bit in the DCI, etc. In another example, a UE may enable or disable an anticipatory NACK feature. For example, the gNB may configure the UE to enable or disable the anticipatory NACK feature only for certain types of traffic. In another example, the UE may observe a low battery level and may transmit a recommendation to the gNB to allow using the anticipatory NACK feature. The recommendation may take any suitable form, such as in an RRC message, as a MAC-CE, or as a UCI.

As in the example illustrated above in FIG. 6, at block 702, the UE may blind decode transmissions in its search space to determine whether the UE is scheduled with wireless communication resources. If the UE is not scheduled (No branch of 704), then the UE may enter into a low-power mode (e.g., a sleep mode) and the UE may skip receiving and decoding the PDSCH. If the UE is scheduled (Yes branch of 704), then at block 706 the UE may employ a predictive channel model 750 to determine a probability of decoding success or failure of the scheduled data transmission on the PDSCH.

In various examples within the scope of the present disclosure, the UE may employ any suitable predictive channel model 750 to determine the probability of decoding success or failure of the scheduled data transmission. The predictive channel model may model the channel based on interference observed in past slots to predict interference in future slots. For example, the predictive channel model 750 may take as an input one or more interference-related parameters, such as an SINR observed in previous slots (752), an interference observed in previous slots (754), and/or any other suitable interference-related parameters 756. With a suitable predictive channel model, the UE may predict the level of interference (e.g., the interference plus noise power) on future resources by using interference correlation properties. That is, a probabilistic approach for interference prediction can account for the statistical behavior of the interference and can obtain a confidence level in the predicted interference.

In some examples, the predictive channel model 750 may include a machine learning (ML) model. For example, a neural network in the predictive channel model 750 may be trained with interference data observations or samples over time such that the ML model learns the trends of how the interference evolves over time. The ML model may be trained using past interference data and, in some examples, may be further trained based on new interference observations or samples. Thus, when the UE makes measurements of a level of interference, or a channel power, etc., the UE may process the measurements via the ML model to generate a decoding confidence estimate for decoding the data transmission in future scheduled slot(s).

In some examples, the predictive channel model 750 may have one or more configurable parameters. For example, a network node may configure a UE such that the predictive channel model 750 uses a given predicted interference power threshold or predicted SNR threshold to activate the anticipatory NACK. In another example, a network node may configure a UE with a given confidence level in decoding failure prediction upon which the UE may send the anticipatory NACK.

Thus, at block 706, the UE may determine or predict a probability of a decoding failure for the scheduled data channel resources. For example, the predictive channel model 750 may generate a decoding confidence estimate and the UE may determine that the decoding confidence estimate is less than a threshold (e.g., a predetermined threshold) decoding confidence level.

If there is no predicted data channel decoding failure (No branch of 706), the process may proceed as described above in FIG. 6. That is, at block 708 the UE may receive and decode the scheduled data channel, and at block 710 the UE may transmit a corresponding HARQ-ACK indicating a decoding success or failure of the data transmission.

If there is a predicted data channel decoding failure (Yes branch of 706), the process may proceed to block 712, and the UE may transmit an anticipatory NACK (i.e., HARQ-ACK feedback of NACK) at the next uplink occasion. Block 714 represents a subroutine for a UE to follow for transmitting the anticipatory NACK, described further below in connection with FIG. 8. At block 716, the UE may enter into a low-power mode or sleep mode, and may skip decoding the scheduled PDSCH. In other examples, described further below, the UE may not necessarily skip decoding the scheduled PDSCH when it transmits the anticipatory NACK. In various examples, the determination of whether a UE skips decoding of the PDSCH when it transmits the anticipatory NACK may be independent of the determination to transmit the anticipatory NACK. That is, an anticipatory NACK may be transmitted independent of, or without, attempting to decode the data transmission.

FIG. 8 is a flow chart illustrating further detail of block 714 from FIG. 7, wherein the UE transmits a UCI including an anticipatory NACK. As described below, a particular implementation may omit some or all illustrated features, and may not require some illustrated features to implement all embodiments. In some examples, the UE 500 illustrated in FIG. 5 may be configured to carry out the process 714. In some examples, any suitable apparatus or means for carrying out the functions or algorithm described below may carry out the process 714.

According to an aspect of the disclosure, when the UE predicts a PDSCH decoding failure, the UE may transmit a UCI including an anticipatory NACK at the next uplink occasion. In other words, the UE need not necessarily wait for the scheduled slot offset (K value) indicating the slot for the UE to transmit its HARQ-ACK feedback to transmit the anticipatory NACK. Rather than waiting, if the UE is scheduled PDSCH resources, if the UE predicts a PDSCH decoding failure, the UE may transmit the anticipatory NACK at the next uplink occasion.

In some examples, the UE may transmit the anticipatory NACK using a separate resource allocated for the anticipatory NACK. For example, when scheduling the PDSCH, the gNB may configure the UE with an extra PUCCH resource for sending the anticipatory NACK. In another example, when scheduling the PDSCH, the gNB may configure the UE with a random access channel (RACH) resource for sending the anticipatory NACK. In various examples, the anticipatory NACK resource can be configured using any suitable signaling, including RRC signaling, a MAC-CE, or a DCI.

At block 802, the UE may transmit HARQ-ACK feedback of NACK as an anticipatory NACK. That is, the NACK does not necessarily indicate an actual decoding failure of the PDSCH. Rather, the NACK may indicate a likelihood (e.g., greater than a threshold confidence level) of a decoding failure of the scheduled PDSCH according to the predictive channel model. The confidence threshold may take any suitable value, and may be set to a value configured to reduce or avoid sending anticipatory NACKs unnecessarily. For example, the confidence threshold may lie in the range of about 80% to 90% confidence of a decoding failure.

In some aspects, the confidence threshold value may be configured depending on the traffic type. For example, for traffic with more stringent latency requirements, the anticipatory NACK may be configured with a lower probability of decoding failure. In further aspects, the confidence threshold value may be configured depending on a power status of a UE. For example, for a UE in a power saving mode with more stringent energy saving requirements, the anticipatory NACK may be configured with a lower probability of decoding failure.

In some examples, where the UE transmits the anticipatory NACK, the UE may skip the process of decoding the PDSCH and may skip the process of obtaining a channel estimate of the PDSCH. In other examples, e.g., at optional block 804, the UE may obtain a channel estimate of the scheduled PDSCH based on a DM-RS included in the PDSCH transmission. Here, channel estimation is a relatively low-power application compared to decoding the PDSCH, and power savings may still be achieved by skipping the process of decoding the PDSCH.

In some examples, at optional block 806, the UE may optionally decode the PDSCH in addition to transmitting the anticipatory NACK. Here, the UE may treat the data on the PDSCH as another HARQ transmission or retransmission. That is, the UE may attempt to decode the PDSCH and may store decoding information in memory, for soft combining with one or more other HARQ transmissions or retransmissions. In this way, although the UE transmits an anticipatory NACK, the UE may improve the probability that the next HARQ retransmission will be successfully decoded by soft combining with the data transmission for which the anticipatory NACK was transmitted.

At optional block 808, the UE may transmit one or more optional feedback elements (e.g., along with the anticipatory NACK transmission of block 802) to the gNB. In some examples, a gNB may configure which additional information elements described below the UE should send with the anticipatory NACK. For example, along with the anticipatory NACK, the UE may provide information based on the predictive channel model to improve the probability that a retransmission of the data transmission on the PDSCH will be successful. For example, the UE may provide a minimum size of a retransmission of the data transmission on the PDSCH; a redundancy version to use for a retransmission of the data transmission on the PDSCH; a time (e.g., a slot assignment) for a retransmission of the data transmission on the PDSCH; a modulation and coding scheme (MCS) for the gNB to use during a retransmission of the data transmission on the PDSCH; etc. In further examples, the UE may provide information indicating a reason for transmission of the anticipatory NACK. For example, the anticipatory NACK may include a reason information element (IE) indicating a reason for the probability of the decoding failure, such as weak channel power, high interference on the scheduled resource, etc.

FIG. 9 is a flow chart illustrating an exemplary process 900 for a UE in accordance with some aspects of the present disclosure. As described below, a particular implementation may omit some or all illustrated features, and may not require some illustrated features to implement all embodiments. In some examples, the scheduling entity 400 illustrated in FIG. 4 may be configured to carry out the process 900. In some examples, any suitable apparatus or means for carrying out the functions or algorithm described below may carry out the process 900.

At block 902, a UE may transmit UE capability information signaling to a network node (e.g., gNB). For example, at any suitable time, using any suitable signaling, the UE may indicate to the gNB that the UE is capable of using a predictive channel model and transmitting an anticipatory NACK. In some examples, the UE may further indicate whether it can skip decoding only, or it can also skip DM-RS-based channel estimation to predict a reliable decoding failure prediction.

At block 904, the UE may receive UE configuration signaling, e.g., from a network node or gNB. For example, at any suitable time, using any suitable signaling, the gNB may configure the UE to employ an anticipatory NACK feature as described in the present disclosure. For instance, the gNB may be operating in an energy saving mode, so it may configure the UE to use the anticipatory NACK feature to sleep early and save energy at the gNB. In another example, based on the traffic type or battery level of the UE, the gNB may configure the UE to use the anticipatory NACK feature and save energy at the UE. In another example, the gNB may configure the UE to enable or disable the decoding failure prediction feature for certain types of traffic, such as low-latency traffic, to meet stringent latency requirements.

The UE configuration signaling may take form as an information element contained in an RRC message, in a MAC-CE, or in a DCI. For instance, the scheduling DCI may include a priority indicator bit indicating a priority of the traffic being scheduled. According to some examples, the UE may enable the anticipatory NACK feature based on the priority indicator bit in the scheduling DCI.

The following numbered clauses are illustrative only and may be combined with aspects of other embodiments or teachings described herein, without limitation.

Clause 1: A method of wireless communication at a UE, comprising: obtaining downlink control information (DCI) comprising scheduling information for a data transmission over one or more data channel resources corresponding to a data channel; predicting a probability of a decoding failure for the one or more data channel resources; and based on the probability of the decoding failure, outputting, for transmission, an anticipatory negative acknowledgment (NACK) indicating an anticipated failure to properly decode the data transmission.

Clause 2: The method of clause 1, further comprising: measuring one or more of a level of interference of the data channel or a channel power of the data channel; and processing the one or more of the level of interference or the channel power via a machine learning model to generate a decoding confidence estimate for the one or more data channel resources, wherein the probability of the decoding failure corresponds to the decoding confidence estimate being less than a confidence threshold.

Clause 3: The method of clause 2, further including obtaining from a network node a confidence configuration parameter configured to indicate the predetermined confidence threshold.

Clause 4: The method of any of clauses 2 to 3, wherein the confidence threshold is in a range of approximately 80%-90%.

Clause 5: The method of any of clauses 1 to 4, further including obtaining, from a network node, scheduling information indicative of a resource for transmission of the anticipatory NACK.

Clause 6: The method of any of clauses 1 to 5, wherein the anticipatory NACK further comprises a reason information element (IE) indicating a reason for the probability of the decoding failure.

Clause 7: The method of any of clauses 1 to 6, wherein the anticipatory NACK further comprises at least one of: a minimum size for a retransmission of the data transmission, a redundancy version (RV) to use for the retransmission of the data transmission, a time for the retransmission of the data transmission, or a modulation and coding scheme (MCS) to use for the retransmission of the data transmission.

Clause 8: The method of any of clauses 1 to 7, wherein the anticipatory NACK is output for transmission independent of attempting to decode the data transmission.

Clause 9: The method of any of clauses 1 to 8, further including attempting to decode the data transmission; storing information relating to the attempt to decode the data transmission; obtaining a retransmission of the data transmission in response to the anticipatory NACK; and soft combining the retransmission with the stored information.

Clause 10: The method of any of clauses 1 to 9, further including obtaining, from a network node, an indicator enabling a feature using the anticipatory NACK.

Clause 11: The method of any of clauses 1 to 10, further including outputting, for transmission to a network node, a recommendation to enable a feature using the anticipatory NACK.

Clause 12: The method of any of clauses 1 to 11, further including outputting an anticipatory NACK capability indicator configured to indicate a capability for the UE to use a feature based on the anticipatory NACK.

Clause 13: The method of clause 12, wherein the DCI further comprises feedback scheduling information indicating a slot offset value, the slot offset value indicating a slot for transmission of hybrid automatic repeat request (HARQ) feedback in response to the data transmission, and wherein the anticipatory NACK capability indicator is further configured to indicate a capability for the UE to output the anticipatory NACK for transmission via an earlier slot than the slot indicated by the slot offset value.

Clause 14: A UE comprising: a transceiver; a memory comprising instructions; and one or more processors configured to execute the instructions to cause the UE to perform a method in accordance with any one of clauses 1 to 13, wherein the transceiver is configured to: receive the DCI, and transmit the anticipatory NACK.

Clause 15: An apparatus for wireless communications, comprising means for performing a method in accordance with any one of clauses 1 to 13.

Clause 16: A non-transitory computer-readable medium comprising instructions that, when executed by an apparatus, cause the apparatus to perform a method in accordance with any one of clauses 1 to 13.

Clause 17: An apparatus for wireless communications, comprising: a memory comprising instructions; and one or more processors configured to execute the instructions to cause the apparatus to perform a method in accordance with any one or clauses 1 to 13.

Clause 18: A method of wireless communication at a network node, comprising outputting, for transmission, DCI comprising scheduling information for a data transmission over one or more data channel resources corresponding to a data channel; obtaining an anticipatory NACK indicating an anticipated failure to properly decode the data transmission; and outputting, for transmission, a retransmission of the data transmission based on the anticipatory NACK.

Clause 19: The method of clause 18, further comprising outputting, for transmission, an indicator enabling a feature using the anticipatory NACK.

Clause 20: The method of any of clauses 18 to 19, further comprising outputting, for transmission, scheduling information indicating resources for a UE to use for transmission of the anticipatory NACK.

Clause 21: The method of any of clauses 18 to 20, further comprising outputting, for transmission, a confidence configuration parameter configured to indicate a confidence threshold for a user equipment (UE) to use for a determination to transmit the anticipatory NACK.

Clause 22: The method of any of clauses 18 to 21, further comprising obtaining at least one of: a reason information element indicating a reason for the anticipated failure; a minimum size for a retransmission of the data transmission; a redundancy version (RV) to use for the retransmission of the data transmission; a time for the retransmission of the data transmission; or a modulation and coding scheme (MCS) to use for the retransmission of the data transmission.

Clause 23: A network node comprising a transceiver; a memory comprising instructions; and one or more processors configured to execute the instructions to cause the network node to perform a method in accordance with any one of clauses 18 to 22. wherein the transceiver is configured to: transmit the DCI, receive the anticipatory NACK, and transmit the retransmission.

Clause 24: An apparatus for wireless communications, comprising means for performing a method in accordance with any one of clauses 18 to 22.

Clause 25: A non-transitory computer-readable medium comprising instructions that, when executed by an apparatus, cause the apparatus to perform a method in accordance with any one of clauses 18 to 22.

Clause 26: An apparatus for wireless communications, comprising: a memory comprising instructions; and one or more processors configured to execute the instructions to cause the apparatus to perform a method in accordance with any one or clauses 18 to 22.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes certain aspects and examples with reference to some illustrations, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

By way of example, various aspects of this disclosure may be implemented within systems defined by 3GPP, such as fifth-generation New Radio (5G NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; aa; bb; ab; aab; a, b and c and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
at least one transceiver;
at least one memory storing instructions; and
one or more processors configured to execute the instructions to cause the apparatus to:
    receive, via the at least one transceiver, downlink control information (DCI) comprising scheduling information for a data transmission over one or more data channel resources corresponding to a data channel; and
    based on a probability of a decoding failure for the one or more data channel resources, transmit, via the at least one transceiver, an anticipatory negative acknowledgment (NACK) indicating an anticipated failure to properly decode the data transmission.

2. The apparatus of claim 1, wherein the one or more processors are further configured to execute the instructions to cause the apparatus to:
    measure one or more of a level of interference of the data channel or a channel power of the data channel; and
    process the at least one of the level of interference or the channel power via a machine learning model to generate a decoding confidence estimate for the one or more data channel resources,
    wherein the probability of the decoding failure corresponds to the decoding confidence estimate being less than a confidence threshold.

3. The apparatus of claim 2, wherein the one or more processors are further configured to execute the instructions to cause the apparatus to:
    receive, via the at least one transceiver and from a network, node a confidence configuration parameter configured to indicate the confidence threshold.

4. The apparatus of claim 2, wherein the confidence threshold is in a range of approximately 80%-90%.

5. The apparatus of claim 1, wherein the one or more processors are further configured to:
    receive, via the at least one transceiver and from a network node, scheduling information indicative of a resource for transmission of the anticipatory NACK.

6. The apparatus of claim 1, wherein the anticipatory NACK further comprises a reason information element (IE) indicating a reason for the probability of the decoding failure.

7. The apparatus of claim 1, wherein the anticipatory NACK further comprises at least one of: a minimum size for a retransmission of the data transmission, a redundancy version (RV) to use for the retransmission of the data transmission, a time for the retransmission of the data transmission, or a modulation and coding scheme (MCS) to use for the retransmission of the data transmission.

8. The apparatus of claim 1, wherein the one or more processors are configured to transmit, via the at least one transceiver, the anticipatory NACK independent of attempting to decode the data transmission.

9. The apparatus of claim 1, wherein the one or more processors are further configured to execute the instructions to cause the apparatus to:
    attempt to decode the data transmission;
    store information relating to the attempt to decode the data transmission;
    receive, via the at least one transceiver, a retransmission of the data transmission in response to the anticipatory NACK; and
    soft combine the retransmission with the stored information.

10. The apparatus of claim 1, wherein the one or more processors are further configured to execute the instructions to cause the apparatus to:
    receive, via the at least one transceiver and from a network node, an indicator enabling a feature using the anticipatory NACK.

11. The apparatus of claim 1, wherein the one or more processors are further configured to execute the instructions to cause the apparatus to:
    transmit, via the at least one transceiver and to a network node, a recommendation to enable a feature using the anticipatory NACK.

12. The apparatus of claim 1, wherein the one or more processors are further configured to execute the instructions to cause the apparatus to:

transmit, via the at least one transceiver, an anticipatory NACK capability indicator configured to indicate a capability for the apparatus to use a feature based on the anticipatory NACK.

13. The apparatus of claim 12, wherein the DCI further comprises feedback scheduling information indicating a slot offset value, the slot offset value indicating a slot for transmission of hybrid automatic repeat request (HARQ) feedback in response to the data transmission, and wherein the anticipatory NACK capability indicator is further configured to indicate a capability for the apparatus to transmit, via the at least one transceiver, the anticipatory NACK via an earlier slot than the slot indicated by the slot offset value.

14. The apparatus of claim 1, wherein the apparatus is configured as a user equipment.

15. An apparatus for wireless communication, comprising:

at least one memory storing instructions; and one or more processors configured to execute the instructions to cause the apparatus to:

transmit, via the at least one transceiver, downlink control information (DCI) comprising scheduling information for a data transmission over one or more data channel resources corresponding to a data channel;

receive, via the at least one transceiver, an anticipatory negative acknowledgment (NACK) indicating an anticipated failure to properly decode the data transmission; and transmit, via the at least one transceiver, a retransmission of the data transmission based on the anticipatory NACK.

16. The apparatus of claim 15, wherein the one or more processors are further configured to execute the instructions to cause the apparatus to:

transmit, via the at least one transceiver, an indicator enabling a feature using the anticipatory NACK.

17. The apparatus of claim 15, wherein the one or more processors are further configured to execute the instructions to cause the apparatus to:

transmit, via the at least one transceiver, scheduling information indicating resources for a user equipment (UE) to use for transmission of the anticipatory NACK.

18. The apparatus of claim 15, wherein the one or more processors are further configured to execute the instructions to cause the apparatus to:

transmit, via the at least one transceiver, a confidence configuration parameter configured to indicate a confidence threshold for a user equipment (UE) to use for a determination to transmit the anticipatory NACK.

19. The apparatus of claim 15, wherein the one or more processors are further configured to execute the instructions to cause the apparatus to:

receive, via the at least one transceiver, at least one of:

a reason information element indicating a reason for the anticipated failure;

a minimum size for a retransmission of the data transmission;

a redundancy version (RV) to use for the retransmission of the data transmission;

a time for the retransmission of the data transmission; or a modulation and coding scheme (MCS) to use for the retransmission of the data transmission.

20. The apparatus of claim 15, wherein the apparatus is configured as a network node.

* * * * *